(12) United States Patent
Shen et al.

(10) Patent No.: US 8,251,577 B2
(45) Date of Patent: Aug. 28, 2012

(54) HEAT SINK TESTER

(75) Inventors: Deng-Qiang Shen, Shenzhen (CN); Hong-Xue Chen, Shenzhen (CN); Dan Huang, Shenzhen (CN); Xin-Xiang Zha, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 582 days.

(21) Appl. No.: 12/543,516

(22) Filed: Aug. 19, 2009

(65) Prior Publication Data

US 2010/0329307 A1    Dec. 30, 2010

(51) Int. Cl.
*G01M 99/00* (2011.01)
*G01K 1/14* (2006.01)

(52) U.S. Cl. ............ 374/44; 374/208; 374/E1.018
(58) Field of Classification Search .......... 374/44, 374/208, E01.018
See application file for complete search history.

(56) References Cited

U.S. PATENT DOCUMENTS

| | | | | |
|---|---|---|---|---|
| 5,263,775 A * | 11/1993 | Smith et al. | ............ | 374/134 |
| 6,418,393 B1 * | 7/2002 | Lu et al. | ............ | 702/130 |
| 7,474,531 B2 * | 1/2009 | Chen et al. | ............ | 361/719 |
| 7,982,477 B2 * | 7/2011 | Ghadaksaz | ............ | 324/750.09 |
| 7,982,484 B2 * | 7/2011 | Schmegner et al. | ..... | 324/762.01 |
| 8,044,673 B1 * | 10/2011 | Burgyan | ............ | 324/750.16 |
| 2005/0160592 A1 * | 7/2005 | Eckblad et al. | ............ | 29/832 |
| 2005/0231919 A1 * | 10/2005 | Ujike et al. | ............ | 361/719 |
| 2006/0050484 A1 * | 3/2006 | Hsieh | ............ | 361/704 |
| 2006/0097337 A1 * | 5/2006 | Haji-Sheikh et al. | ......... | 257/462 |
| 2007/0013385 A1 * | 1/2007 | Taylor et al. | ............ | 324/537 |
| 2008/0095211 A1 * | 4/2008 | You et al. | ............ | 374/45 |
| 2009/0196325 A1 * | 8/2009 | Liu | ............ | 374/147 |

FOREIGN PATENT DOCUMENTS

| | | | |
|---|---|---|---|
| TW | 268578 U | * | 7/2005 |
| TW | 279854 U | * | 11/2005 |
| TW | 308446 U | * | 3/2007 |
| TW | 358296 U | * | 6/2009 |
| WO | WO 2007115474 A1 | * | 10/2007 |

* cited by examiner

*Primary Examiner* — R. A. Smith
(74) *Attorney, Agent, or Firm* — Altis Law Group, Inc.

(57) ABSTRACT

A heat sink tester for pressing a heat sink against a simulation heat source includes a base, a pressing assembly and a supporting device. The base is for supporting the heat sink thereon. The pressing assembly presses the heat sink against the base along a first direction. The supporting device is for supporting the simulation heat source thereon. The supporting device pushes the simulation heat source through the base to engage against the heat sink along a second direction opposite to the first direction.

10 Claims, 5 Drawing Sheets

HEAT SINK TESTER

BACKGROUND

1. Technical Field

The disclosure relates to a heat sink tester, and more particularly to a heat sink tester wherein the heat sink is used for dissipating heat generated by an electronic component. The heat sink tester can reliably and quickly decide the performance of the heat sink to decide whether it meets the predetermined requirements.

2. Description of Related Art

When testing a heat sink, the heat sink and a simulation heat source which functions at an actual heat-generating electronic component, such as a CPU, to be cooled by the heat sink should be brought to engage with each other tightly. This engagement is provided to ensure that there is a proper heat transfer between the heat sink and the simulation heat source during the testing. Therefore, a heat sink tester is usually used for pressing the heat sink against the simulation heat source during the testing.

A conventional heat sink tester includes a testing table for supporting the heat sink thereon, a pneumatic cylinder for supporting the simulation heat source thereon and a baffle plate located above and spaced a distance from a top surface of the heat sink. The pneumatic cylinder and the simulation heat source are both located under the testing table with a top surface of the simulation heat source aimed at a bottom surface of the heat sink. When testing the performance of the heat sink, the pneumatic cylinder firstly pushes the simulation heat source upwardly towards the heat sink to attach the simulation heat source to the bottom surface of the heat sink. Then, the simulation heat source and the heat sink are moved together by the push of the pneumatic cylinder towards the baffle plate until the top surface of the heat sink contacts the baffle plate.

However, when the pneumatic cylinder pushes the simulation heat source and the heat sink together towards the top plate of the testing table, the heat sink may shake or tremble, which results in a relative movement of the heat sink to the simulation heat source. Thus, a position of the heat sink to which the heat source is attached is unfavorably changed. However, testing results of the heat sink are different when the heat source attached to different portions of the bottom surface of the heat sink. Therefore, the testing result to determining the performance of the heat sink is greatly affected and inaccurate.

It is thus desirable to provide a heat sink tester which can overcome the described limitations.

DETAILED DESCRIPTION

Figure 1:
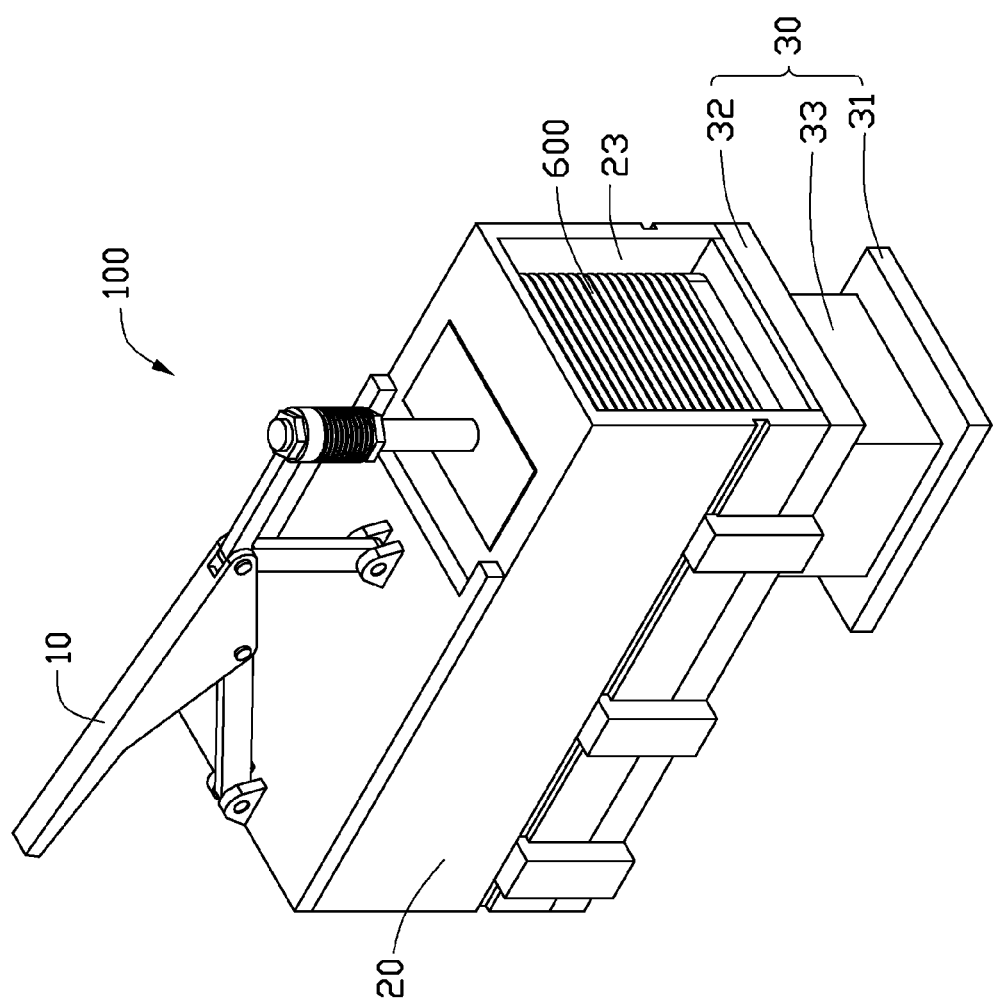
FIG. 1 is an isometric, assembled view of a heat sink tester for testing a heat sink according to an exemplary embodiment.

Reference will now be made to the drawing figures to describe the present heat sink tester in detail.

Figure 2:
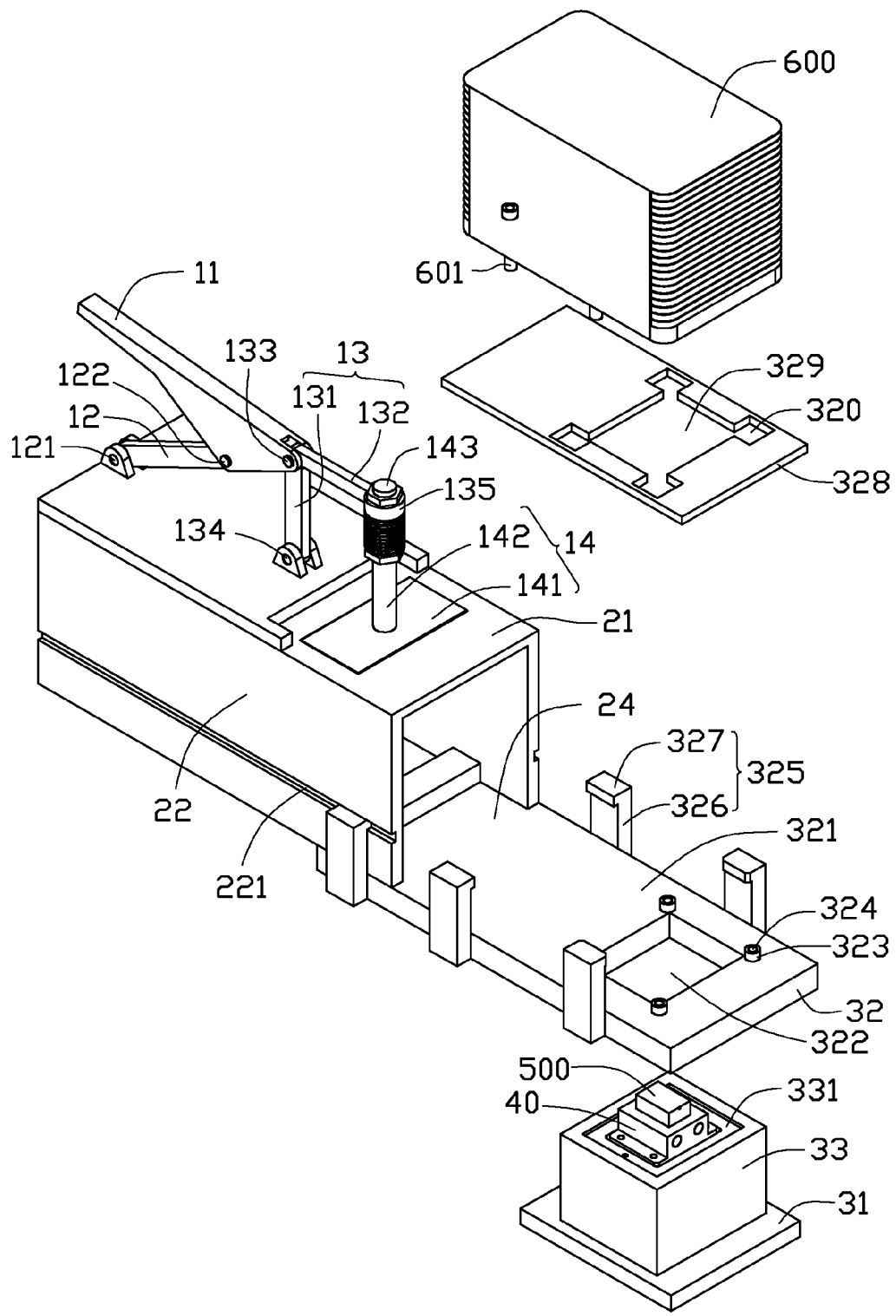
FIG. 2 is an isometric, exploded view of the heat sink tester of FIG. 1.

FIGS. 1-2 illustrate a heat sink tester 100 in accordance with an exemplary embodiment of the disclosure. The heat sink tester 100 is for mounting a heat sink 600 to a simulation heat source 500 to test the heat sink 600 and check whether the performance of the heat sink 600 can meet predetermined requirements. The heat sink tester 100 includes a pressing assembly 10, a cover 20, a base 30 and a supporting device 40.

The heat sink 600 is rectangular, and includes a plurality of mounting pins 601 extending downwardly from a bottoms surface thereof.

The base 30 includes a rectangular bottom plate 31, an elongated worktable 32 located above the bottom plate 31 and a housing 33 located between the bottom plate 31 and the worktable 32. The worktable 32 is plate-shaped and parallel to the bottom plate 31. The worktable 32 has a width substantially equal to a width of the bottom plate 31, and has a length larger than a length of the bottom plate 31. The worktable 32 is for supporting the heat sink 600 thereon. The housing 33 is mounted on the bottom plate 31, and defines a receiving space 331 having a configuration of rectangular parallelepiped. The receiving space 331 is for receiving the supporting device 40 therein. A first through hole 322 corresponding to the receiving space 331 of the housing 33 is defined in the worktable 32.

A plurality of positioning arms 325 extend upwardly from two opposite sides (i.e., a front side and a rear side) of the worktable 32, respectively. Each of the positioning arms 325 is "L"-shaped, and includes a pole 326 extending upwardly and perpendicularly from a corresponding side of the worktable 32 and a hook 327 extending horizontally and inwardly from a top end of the pole 326 towards each other. The hooks 327 of the positioning arms 325 are leveled with each other and parallel to the worktable 32. The positioning arms 325 at one side of the worktable 32 are equally spacing from each other along a length direction of the worktable 32. In this embodiment, each side of the worktable 32 includes three positioning arms 325.

A plurality of mounting posts 323 extend upwardly from a top surface 321 of the worktable 32. In this embodiment, there are four mounting posts 323 arranged around the first through hole 322 and respectively located at four corners of the first through hole 322. Each of the mounting posts 323 defines a mounting hole 324 therein. The mounting holes 324 of the mounting posts 323 are respectively for receiving the mounting pins 601 the heat sink 600 therein. A backing plate 328 is located on the top surface 321 of the worktable 32. The backing plate 328 defines a second through hole 329 corresponding to the first through hole 322 of the worktable 32 and four cavities 320 around the second through hole 329. The four cavities 320 are located at four corners of the second through hole 329, respectively, and communicate the second through hole 329. Each of the first and second through holes 322, 329 has a rectangular configuration. When the backing plate 328 is attached to the top surface 321 of the worktable 32, the second through hole 329 of the backing plate 328 is aligned with the first through hole 322 of the worktable 32 and the mounting posts 323 extend upwardly through the cavities 320, respectively.

The cover 20 includes an elongated top wall 21 and two sidewalls 22 extending perpendicularly and downwardly from front and rear sides of the top wall 21. The top wall 21 has a size substantially equal to that of the worktable 32 of the base 30. The cover 20 defines an opening 24 at a bottom end thereof facing the top surface 321 of the worktable 32. A cross-section of the cover 20 is about inverted "U"-shaped. The top wall 21 defines a rectangular aperture 211 at a right end thereof. A guiding slot 221 parallel to the top wall 21 is defined in an outer surface of each of the sidewalls 22 of the cover 20. Each of the guiding slots 221 extends horizontally along a left-to-right direction and traverses through left and right ends of the sidewall 22. Each guiding slot 221 is for receiving therein the hooks 327 of the positioning arms 325 at a corresponding side of the worktable 32.

When connecting the cover 20 to the worktable 32, firstly the cover 20 is positioned at a left end of the worktable 32 with the opening 24 facing downwardly and the guiding slots 221 of the sidewalls 22 aligning with the hooks 327 of the positioning arms 325, respectively; then the cover 20 is pushed to move horizontally from the left end of the worktable 21 towards a right end of the worktable 21 with the hooks 327 sliding along a corresponding guiding slot 221 until the cover 20 fully covers on the worktable 32. Thus the worktable 32 closes the opening 24 at the bottom end of the cover 20. The cover 20 and the worktable 32 cooperatively define a receiving room 23 for receiving the heat sink 600 therein. A clearance is defined between a top surface of the heat sink 600 and the top wall 21 of the cover 20. The rectangular aperture 211 of the top wall 21 is located just above the first through hole 322 of the worktable 32 and the second through hole 329 of the backing plate 328.

The pressing assembly 10 is a linkage mechanism. The pressing assembly 10 includes an operating handle 11, a connecting rod 12, a driving arm 13, and a pressing portion 14. The connecting rod 12 is aslant, and has a first end 121 hinged with a left end of the top wall 21 of the cover 20 and an opposite second end 122 hinged with the operating handle 11. The driving arm 13 includes a supporting post 131 and a linking post 132 perpendicular to the supporting post 131. The supporting post 131 is vertical, when a pressing block 141 of the pressing portion 14 is fitted in the rectangular aperture 211 of the top wall 21 of the cover 20, as shown in FIG. 2. The supporting post 131 has a bottom end 134 hinged with a middle portion of the top wall 21 of the cover 20 and an opposite top end 133 hinged with the operating handle 11 at a point in right of the hinged point of the second end 122 of the connecting rod 12 with the operating handle 11. The linking post 132 extends integrally, horizontally and rightwards from the top end 133 of the supporting post 131 to form a free end 135 away from the top end 133 of the supporting post 131. The linking post 132 defines a screw hole at the free end 135 thereof. The driving arm 13 is hinged with the operating handle 11 via the top end 133 of the supporting post 131. The pressing portion 14 includes the pressing block 141 and a post 142 extending upwardly from a top surface of the pressing block 141. The post 142 forms a plurality of screw threads at a top end 143 thereof. The top end 143 of the post 142 traverses through the free end 135 of the linking post 132 from bottom to top via the screw hole and connects the free end 135 of the linking post 132 by screwing. The pressing block 141 has width and length slightly smaller than those of the rectangular aperture 211 of the top wall 21 of the cover 20, and a thickness larger than a thickness of the top wall 21.

The supporting device 40 is a pneumatic cylinder. The supporting device 40 is received in the receiving space 331 of the housing 33. The simulation heat source 500 is mounted on a top end of the supporting device 40 with a top surface thereof aimed at the first through hole 322 of the worktable 32 and the second through hole 329 of the backing plate 328. The supporting device 40 is configured for pushing the simulation heat source 500 upwardly towards the first through hole 322 of the worktable 32 to thereby fixedly attach the simulation heat source 500 to the bottom surface of the heat sink 600 which is positioned on the worktable 32.

In testing the heat sink 600, a method for using the heat sink tester 100 to tightly press the heat sink 600 against the simulation heat source 500 includes the following steps.

Figure 3:
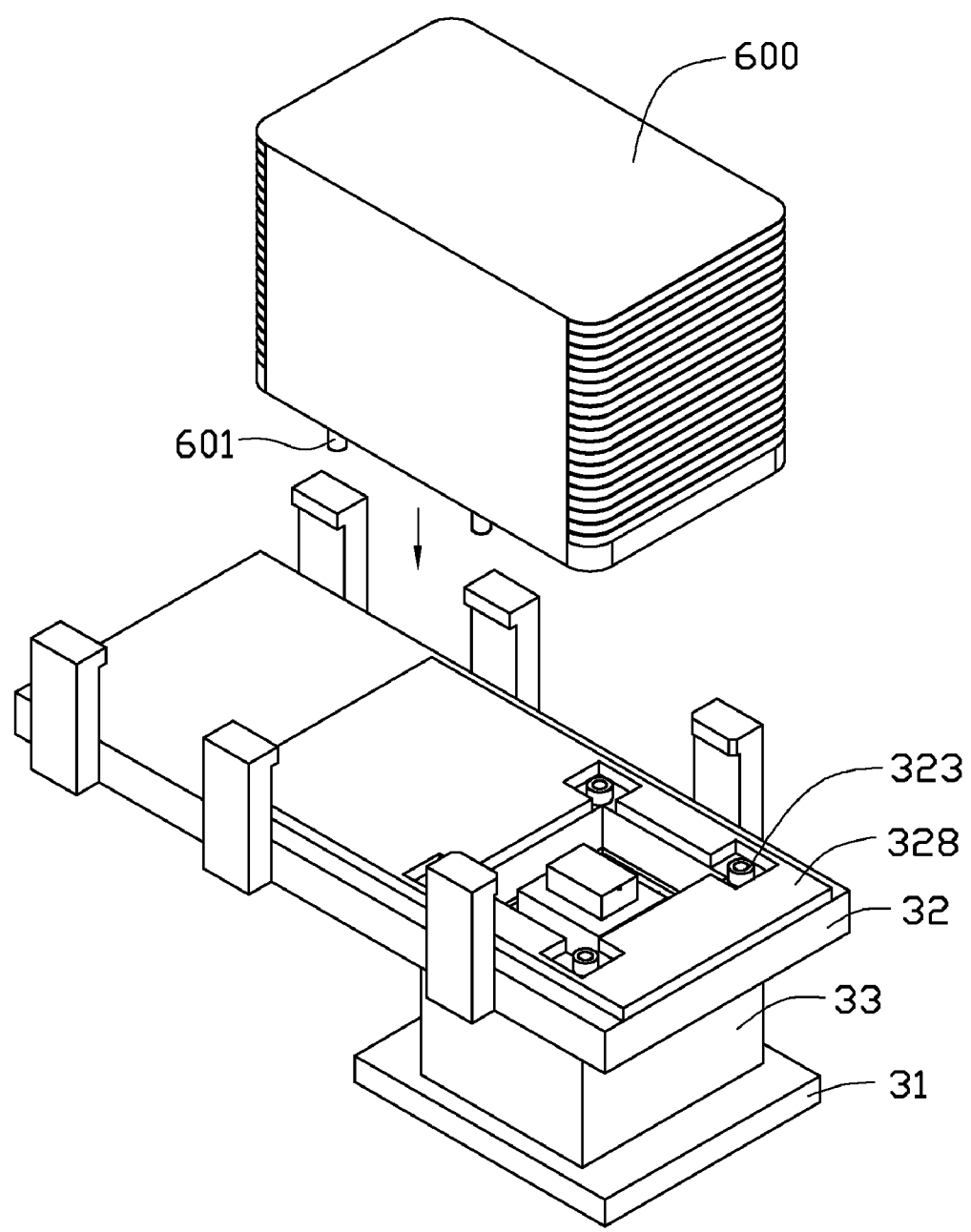
FIG. 3 is a schematic view showing mounting the heat sink onto a base of the heat sink tester.

In step 1, referring to FIG. 3, the heat sink 600 is positioned on the worktable 32 of the base 30 with the mounting pins 601 of the heat sink 600 inserted into the mounting holes 324 of the mounting posts 323 of the worktable 32, respectively. The first through hole 322 of the worktable 32 and the second through hole 329 of the backing plate 328 are located just under the bottom surface of the heat sink 600. Thus a periphery of the bottom surface of the heat sink 600 contacts a top surface of the backing plate 328 around the second through hole 329, and a selected portion of the bottom surface of the heat sink 600 is exposed to the through hoes 322, 329 for facing the simulation heat source 500 in the housing 33 of the base 30.

Figure 4:
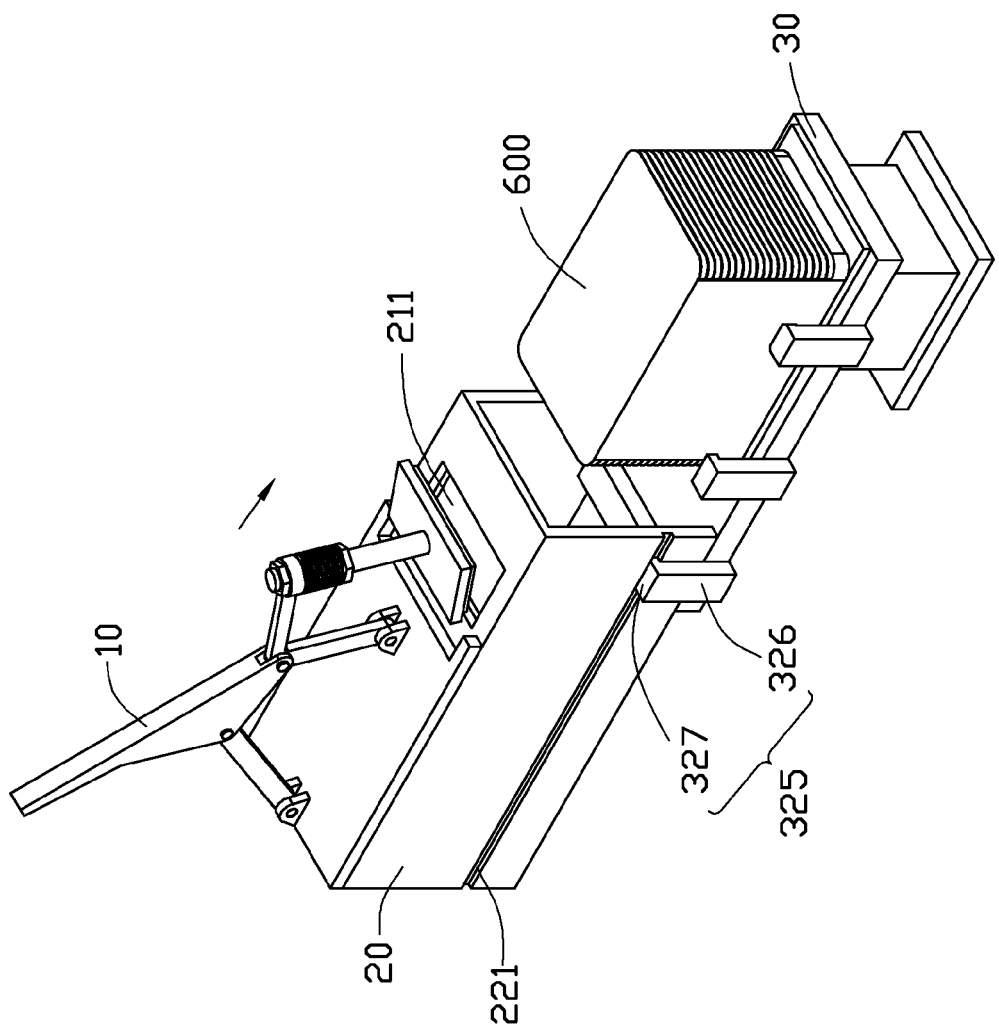
FIG. 4 is a schematic view showing assembling a cover of the heat sink tester onto the base after the heat sink is assembled to the base.

In step 2, referring to FIG. 4, the cover 20 is then mounted to the worktable 32 of the base 30 to reach a position in which the cover 20 encloses the heat sink 600 and the heat sink 600 is located between the worktable 32 and the cover 20. Atop surface of the heat sink 600 faces the top wall 21 of the cover 20. The rectangular aperture 211 of the top wall 21 is located above the top surface of the heat sink 600 and aligned with the first through hole 322 of the worktable 32 and the second through hole 329 of the backing plate 328 along a top-to-bottom direction. The hooks 327 of the positioning arms 325 of the worktable 32 are received in the guiding slots 221 of the sidewalls 22 of the cover 20, respectively. The cover 20 is horizontally movable with respect to the worktable 32.

Figure 5:
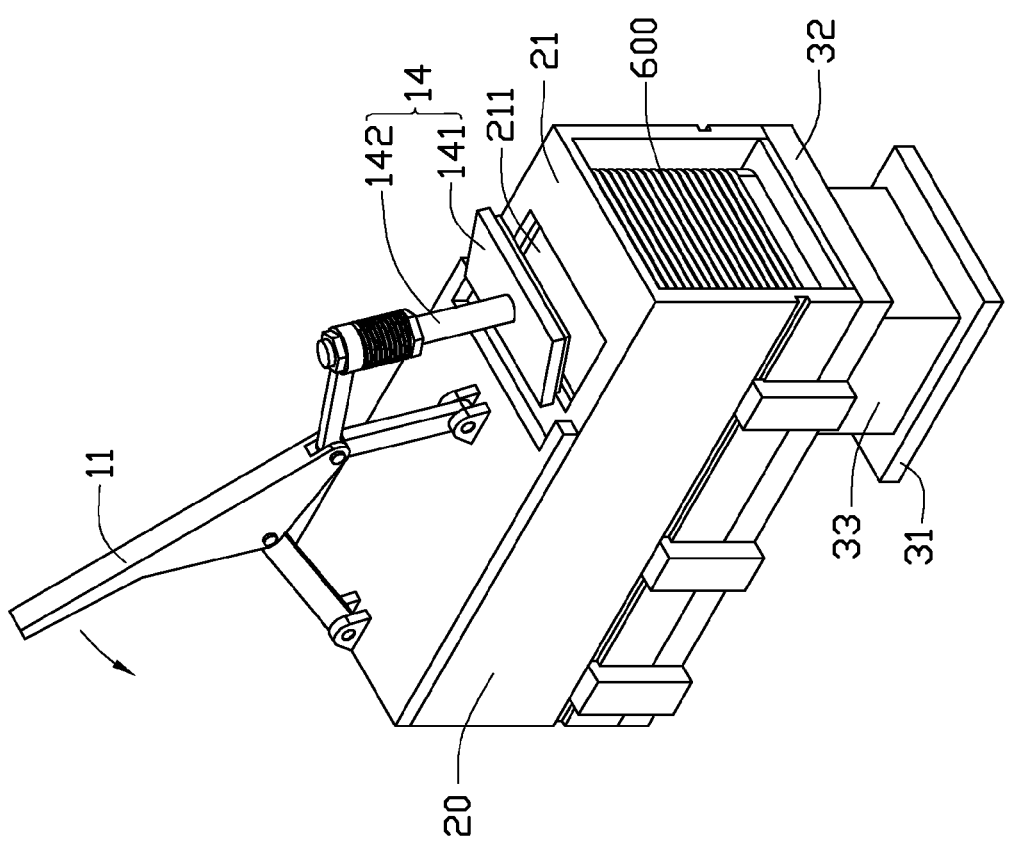
FIG. 5 is a schematic view showing that a pressing assembly of the heat sink tester is manipulated to cause a pressing block thereof to generate a downward force onto the heat sink.

In step 3, referring to FIG. 5, the operating handle 11 of the pressing assembly 10 is pressed downwardly to cause the pressing block 141 to move downwardly until the pressing block 141 traverse through the rectangular aperture 211 of the top wall 21 and tightly contacts to the top surface of the heat sink 600 (FIG. 1). The pressing block 141 applies a downward force on the top surface of the heat sink 600 to cause the bottom surface of the heat sink 600 to contact the top surface of backing plate 328 tightly. Thus, the pressing block 141 of the pressing assembly 10 and the worktable 32 of the base 30 cooperatively limit a vertical movement of the heat sink 600.

Finally, the simulation heat source 500 is pushed upwardly towards the worktable 32 via the supporting device 40. The simulation heat source 500 traverses through the first through hole 322 of the worktable 32 and the second through hole 329 of the backing plate 328 and then tightly contacts the selected portion of the bottom surface of the heat sink 600.

Since the pressing assembly 10 applies the downward force on the top surface of the heat sink 600, the heat sink 600 will not shake or tremble when the simulation heat source 500 reaches the bottom surface of the heat sink 600. Since the mounting posts 324 are formed around the first through hole 322 of the worktable 32, different heat sinks which have the same mounting pins 601 can be precisely mounted on a same position of the base 30 by inserting the mounting pins 601 thereof into the mounting posts 324, whereby the simulation heat source 500 can be precisely attached to a selected position of each of the heat sinks. Therefore, the heat sink tester 100 according to the present disclosure can test the different heat sinks.

In the present disclosure, the insertion of the mounting pins 601 into the mounting posts 324 limit a relative movement between the heat sink 600 and the worktable 32 along a horizontal direction, whereby the heat sink 600 can be more accurately located relative to the simulation heat source 500; thus, the test result can more accurately reflect the actual performance of the heat sink 600.

In the present disclosure, when mounting the heat sink 600 to a real heat-generating electronic component, such as a CPU mounted on a printed circuit board, the mounting pins 60 are used for engaging with a back plate attached to a bottom surface of the printed circuit board. In addition, according to the present disclosure, the backing plate 328 is made of resilient material, such as rubber.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat sink tester for testing a heat sink comprising:
   a base for supporting the heat sink thereon;
   a pressing assembly pressing the heat sink against the base along a first direction; and
   a supporting device for supporting a simulation heat source thereon, the supporting device pushing the simulation heat source through the base to engage against the heat sink along a second direction opposite to the first direction; and
   a cover connected to the base;
   wherein the pressing assembly comprises an operating handle and a pressing block, when the operating handle is pressed downwardly, the pressing block moves downwardly to apply a downward force on a top surface of the heat sink; and
   wherein the cover comprises a top wall and two sidewalls extending downwardly from two opposite sides of the top wall, the cover and the base cooperatively define a receiving room for receiving the heat sink therein.

2. The heat sink tester as described in claim 1, wherein the base comprises a worktable and a housing located under the worktable, the housing defining a receiving space for receiving the supporting device therein, a through hole communicated with the receiving space of the housing being defined in the worktable, the heat sink mounted on the worktable and above the through hole, the supporting device pushing the heat source to extend through the through hole and engage with the heat sink.

3. The heat sink tester as described in claim 2, wherein the base further comprises a backing plate located between the heat sink and the worktable, the backing plate defining a through hole aligned with the through hole of worktable, the backing plate being made of elastic material.

4. The heat sink tester as described in claim 1, wherein the pressing assembly is mounted on the top wall, an aperture being defined in the top wall for the pressing block extending therethrough, a thickness of the pressing block being larger than a thickness of the top wall.

5. The heat sink tester as described in claim 1, wherein a guiding slot is defined in an outer surface of each of the sidewalls, a plurality of positioning arms extending upwardly from two opposite sides of the worktable, respectively, each of the positioning arms comprising a pole connected a corresponding side of the worktable and a hook extending inwardly from a top end of the pole, the cover being moveable with respect to the base with the hooks of the positioning arms sliding along the guiding slots of the sidewalls, respectively.

6. The heat sink tester as described in claim 1, wherein the heat sink comprises a plurality of mounting pins, a plurality of mounting holes being defined in the base for respectively receiving the mounting pins of the heat sink therein.

7. A method for testing a heat sink comprising:
   providing a base, mounting the heat sink on the base;
   providing a pressing assembly pressing the heat sink against the base along a first direction; and
   providing a supporting device with a simulation heat source mounted thereon, the supporting device pushing the simulation heat source through the base to engage against the heat sink along a second direction opposite to the first direction;
   wherein a resilient backing plate is sandwiched between the base and the heat sink.

8. The method as described in claim 7, wherein the pressing assembly presses a top surface of the heat sink, and the supporting device pushes the simulation heat source upwardly towards a bottom surface of the heat sink to tightly contact the bottom surface of the heat sink.

9. The method as described in claim 8, wherein the base has a plurality of mounting posts thereon and the heat sink has a plurality of mounting pins extending downwardly from the heat sink and fitted in the mounting posts when mounting the heat sink on the base, to thereby limit a relative movement between the heat sink and the base along a horizontal direction.

10. A heat sink tester for testing a heat sink comprising:
    a base for supporting the heat sink thereon;
    a pressing assembly pressing the heat sink against the base along a first direction; and
    a supporting device for supporting a simulation heat source thereon, the supporting device pushing the simulation heat source through the base to engage against the heat sink along a second direction opposite to the first direction;
    wherein the base comprises a worktable and a housing located under the worktable, the housing defining a receiving space for receiving the supporting device therein, a through hole communicated with the receiving space of the housing being defined in the worktable, the heat sink mounted on the worktable and above the through hole, the supporting device pushing the heat source to extend through the through hole and engage with the heat sink; and
    wherein the base further comprises a backing plate located between the heat sink and the worktable, the backing plate defining a through hole aligned with the through hole of worktable, the backing plate being made of elastic material.

* * * * *

UNITED STATES PATENT AND TRADEMARK OFFICE
CERTIFICATE OF CORRECTION

PATENT NO. : 8,251,577 B2  
APPLICATION NO. : 12/543516  
DATED : August 28, 2012  
INVENTOR(S) : Deng-Qiang Shen et al.

Page 1 of 1

It is certified that error appears in the above-identified patent and that said Letters Patent is hereby corrected as shown below:

Title Page, below Item (65) insert

-- (30)    Foreign Application Priority Data

Jun. 30 2009    (CN) ...........................2009 1 0303870 --

Signed and Sealed this
Thirty-first Day of December, 2013

Margaret A. Focarino
*Commissioner for Patents of the United States Patent and Trademark Office*